United States Patent [19]
Delattre et al.

[11] Patent Number: 5,184,054
[45] Date of Patent: Feb. 2, 1993

[54] FRICTION ACTUATOR

[75] Inventors: Jacques Delattre, Valpuiseaux; Philippe Gouze, Villemoisson; Jacques Neuvessel, Neuilly S. Seine, all of France

[73] Assignee: Societe de Fabrication d'Instruments de Mesure (S.F.I.M.), Massy- Cedex, France

[21] Appl. No.: 764,321

[22] Filed: Sep. 24, 1991

[30] Foreign Application Priority Data

Sep. 24, 1990 [FR] France ............... 90 11740

[51] Int. Cl.$^5$ ............................................. B64C 27/82
[52] U.S. Cl. ........................................ 318/586; 318/628; 318/12
[58] Field of Search .............. 318/586, 628, 9, 11, 318/12, 14, 15, 543, 544, 545, 546, 549, 550, 552, 553, 554, 555

[56] References Cited

U.S. PATENT DOCUMENTS

| | | | |
|---|---|---|---|
| 2,471,637 | 5/1949 | MacCallum | 318/489 |
| 2,699,833 | 1/1955 | Jensen . | |
| 2,861,576 | 11/1958 | Feucht et al. . | |
| 3,378,217 | 4/1968 | Diani . | |
| 3,986,090 | 10/1976 | Hecker et al. | 318/488 |
| 4,345,195 | 8/1982 | Griffith et al. | 318/628 |
| 4,992,713 | 2/1991 | McCollum et al. | 318/586 |
| 5,068,584 | 11/1991 | Herent et al. | 318/549 |

FOREIGN PATENT DOCUMENTS 1023831 3/1966 United Kingdom .

Primary Examiner—Bentsu Ro
Attorney, Agent, or Firm—Jacobson, Price, Holman & Stern

[57] ABSTRACT

An actuator suitable for autopilot control of a helicopter tail rotor comprises a direct current motor, a non-reversible gearbox, a speed reducer driving an output shaft, a friction device disposed between the non-reversible gearbox and the speed reducer and a friction exceeded sensing device adapted to cut off the supply of power to the motor.

5 Claims, 2 Drawing Sheets ial
FRICTION ACTUATOR

BACKGROUND OF THE INVENTION

1. Field of the invention

The present invention concerns an actuator comprising a direct current motor, a non-reversible gearbox and a speed reducer driving an output shaft.

The invention applies advantageously to autopilot control of the tail rotor of a helicopter to control the bearing (yaw control).

2. Description of the prior art

Known yaw flight controls in helicopters comprise a linkage connecting the rudder bar controlled by the pilot to the tail rotor. In the specific case of yaw control the linkage comprises a friction device the main function of which is to define an anchor or mean control point as the last "memorized" position of the linkage subsequent to action on the rudder bar by the pilot. In autopilot mode the bearing of the helicopter is maintained by a parallel or trim actuator which, in addition to the components listed above, comprises a clutch between the non-reversible gearbox and the speed reducer plus means for sensing the position of the output shaft which controls the movement applied by the actuator to a non-fixed point of the linkage. The actuator components are housed in a dust-proof casing. In one prior art implementation the yaw flight controls comprise said friction device in a parallel arrangement and a force sensor in series with the rudder bar.

When the autopilot is engaged the bearing is sensed and compared by the autopilot computer to a set point value. If the actual bearing and the set point value are different, an error signal is applied to the power supply of the motor until the aircraft is returned to the required bearing by the action of the trim actuator.

Because of the presence of the friction device the last position of the output shaft is fixed. When the helicopter pilot wishes to resume manual control he applies to the rudder bar an action detected by the force sensor which if the force is above a threshold $F_B$ cuts off the power supply to the clutch of the actuator, so disengaging the autopilot. Provided that the threshold $F_B$ is less than the sum of the friction $F_e$ applied by the friction device and the non-localized friction $F_t$ of the flight control linkage, the pilot resumes yaw control in the last position of the trim actuator before it was disengaged. Because the pilot must be able to overcome the friction $F_e$ relatively easily when flying manually, the friction $F_e$ must be below a comfort threshold $F_c$.

The value of $F_e$ must therefore satisfy the condition:

$$F_B - F_t < F_e < F_c \quad (1)$$

Using the conventional dry friction technique in which two parts rub on each other, the friction $F_e$ is relatively inaccurate and unreliable. It requires frequent adjustment if the relationship (1) is to be always satisfied.

A major drawback of prior art yaw trim actuators is that in autopilot mode the actuator motor must overcome at all times the resisting torque induced by friction at the output shaft, so that it is necessary to use a powerful motor with a short service life.

One object of the invention is to overcome the technical problem of providing an actuator of the kind described previously which, by virtue of an advantageous configuration of the friction device within the actuator system, has the advantage that in autopilot mode said friction does not resist drive movement of the motor but, with the autopilot disengaged and manual control resumed, defines the yaw flight control anchor point as the last memorized position of the actuator.

SUMMARY OF THE INVENTION

The present invention consists in an actuator comprising a direct current motor, a non-reversible gearbox, a speed reducer driving an output shaft, a friction device disposed between said non-reversible gearbox and said speed reducer and a friction exceeded sensing device adapted to cut off the supply of power to said motor.

As will be described in more detail later, in autopilot mode the friction device disposed in series in the actuator system has no fixed point and therefore transmits the rotation of the motor without resistance to the output shaft via the speed reducer, provided that no resisting torque greater than the friction is applied to the output shaft. When the pilot wishes to resume manual control, his action on the rudder bar produces at the output shaft a resisting torque greater than the friction which is detected by said friction exceeded sensing device which then disengages the actuator by cutting off the power supply to the motor. The end of the friction device coupled to the non-reversible gearbox thus becomes a fixed point which "memorizes" the last position of the actuator before it is disengaged and so defines the manual control anchor point in the usual way as the last pilot action exerted on the rudder bar.

In one specific embodiment of an actuator in accordance with the invention the friction exceeded sensing device comprises contact detecting slippage of the friction device. The precision of the resulting triggering is not critical in that the friction exceeded sensing device includes an output shaft torque sensor. Whichever solution is adopted, the friction exceeded sensing device, which has the same function as the prior art force sensor in series with the flight control system, can easily be integrated into the actuator. This has the remarkable advantage that the friction and force sensing devices can be contained in the same dust-proof casing as the conventional trim actuator components.

Finally, to eliminate the frequent adjustments required to the friction devices usually employed the friction device is preferably a hysteresis brake which in principle requires no adjustment.

In conclusion, the combination of the friction and force sensing functions in an actuator in accordance with the invention makes it possible to reduce significantly the total weight of the actuator. The absence of adjustment and the integration significantly reduce the purchase, installation and maintenance costs of the actuator.

The following description with reference to the appended drawings is given by way of non-limiting example only and explains in what the invention consists and how it can be carried into effect.

DETAILED DESCRIPTION OF THE INVENTION

Figure 1:
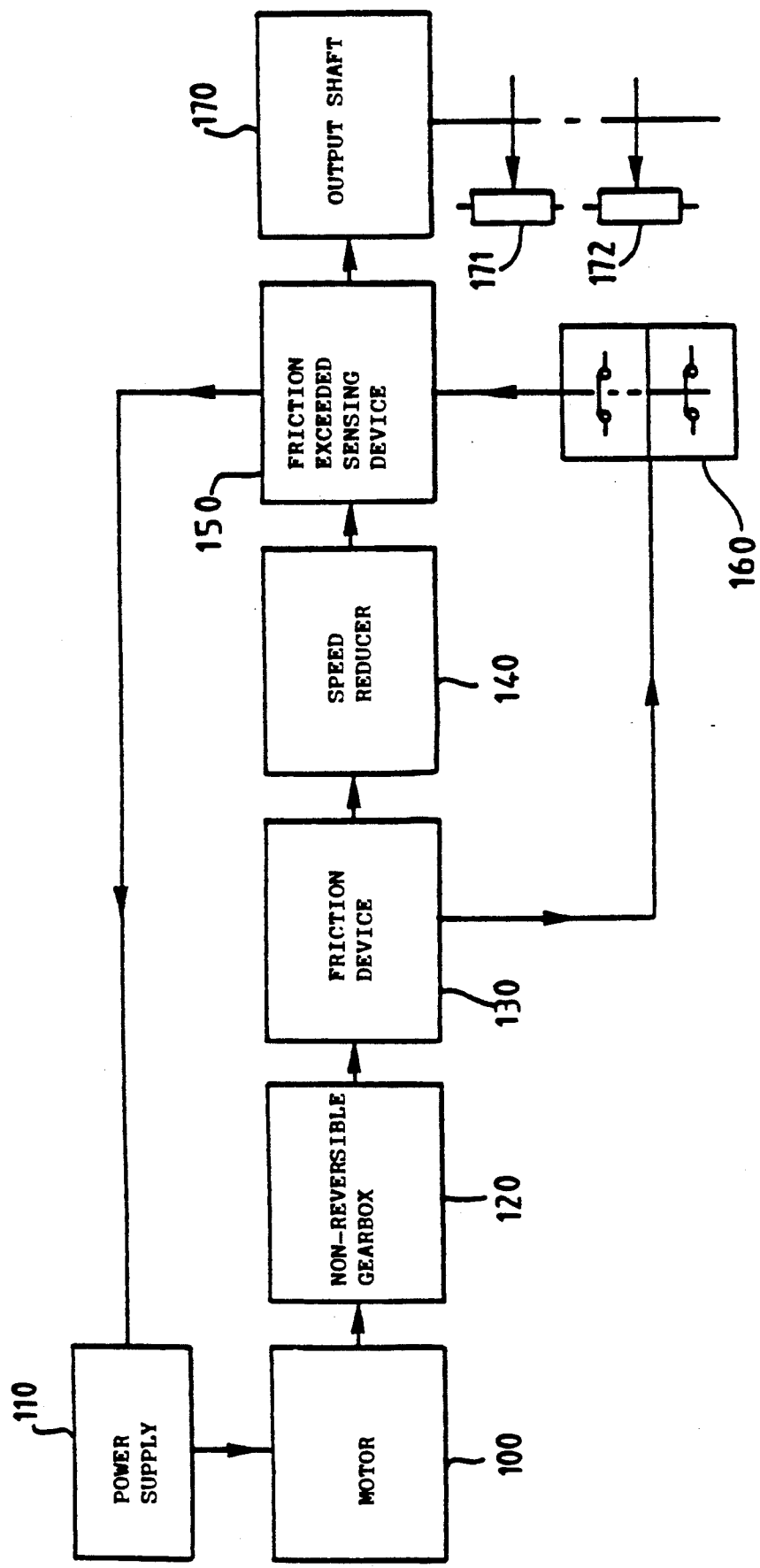
FIG. 1 is a block diagram of a trim actuator in accordance with the invention.

The FIG. 1 diagram shows an actuator such as a helicopter yaw flight control trim actuator comprising a direct current motor 100 connected to a direct current power supply 110. In autopilot mode the motor 100 drives through a non-reversible lead screw gearbox 120 one end of a friction device 130 whose other end drives an output shaft 170 through a speed reducer 140, provided that the torque to be driven is below the friction threshold. Said output shaft 170 is coupled to a point on the yaw control linkage (not shown) and is provided with two potentiometers 171, 172 to indicate the position of said shaft. This information provides the actual yaw coordinate which is transmitted to the autopilot computer which compares it with set point data to control the position of the output shaft by action on the power supply 110 of the motor 100. The motor 100 has no friction to overcome. Being subjected to a reduced resisting force, it can be smaller or have a longer service life than its prior art counterpart.

The friction $F_e$ developed by the friction device 130 must, because of the speed reducer 140, be greater than the friction exerted on the actuator, namely the non-localized flight control friction comprising the pilot side friction $F_p$ and the friction $F_t$ of the linkage:

$$F_e > F_p + F_t$$

If pilot action on the rudder bar causes the torque applied to the output shaft 170 to exceed the friction $F_e$ a friction exceeded sensing device 150 comprising a torque sensor on said output shaft and connected to contacts 160 sensing slippage of the friction device cuts off the power supply 110 from the motor 100, so returning to manual yaw control.

With no power supply to the motor 100, the fixed point is provided by the non-reversible lead screw gearbox 120. The friction device therefore has a fixed point at one end. A torque greater than the friction threshold applied to the output shaft 170 moves the rudder bar anchor point. In this way the last position of the rudder bar set by the pilot is fixed.

Figure 2:
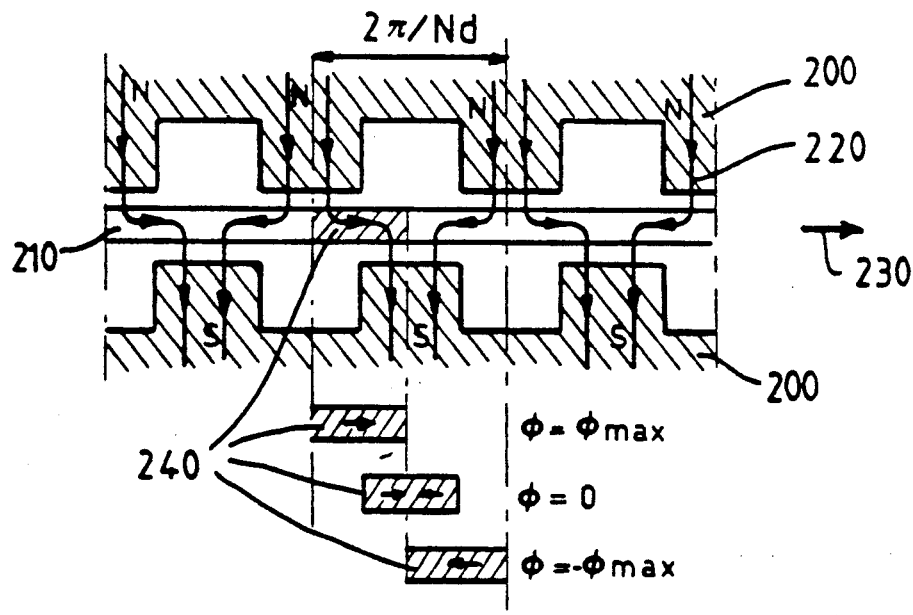
FIG. 2 is a schematic diagram of a hysteresis brake.

The friction device 130 is advantageously a hysteresis brake as shown in FIG. 2. It comprises a stator 200 producing a magnetic field in a rotating disk 210 with high hysteresis losses. The magnetic flux lines 220 are shown schematically in FIG. 2.

Figure 3:
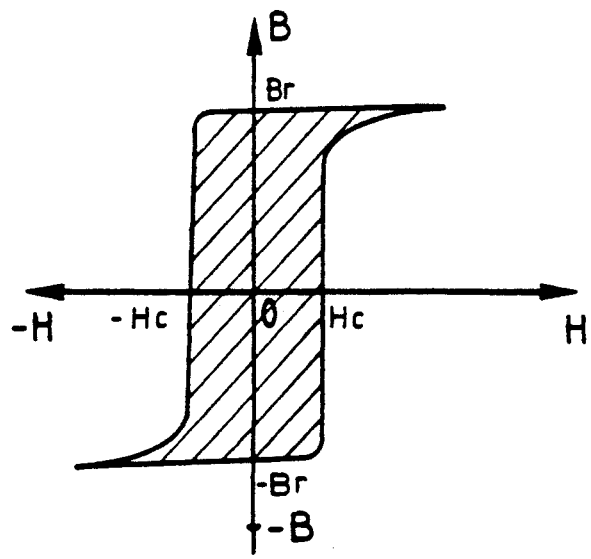
FIG. 3 is a diagram showing the hysteresis cycle of a hysteresis brake.

For a displacement of the rotating disk 210 in the direction of the arrow 230 by one tooth pitch of the stator 200, each area 240 of the disk 210 is magnetized alternately in one direction ($\phi = \phi_{max}$) and in the other direction ($\phi = -\phi_{max}$) and so follows the hysteresis cycle of FIG. 3 in which $H_c$ and $B_r$ respectively represent the coercive field and the remanent magnetization.

Figure 4:
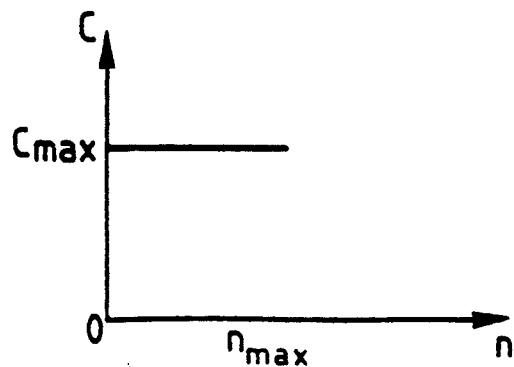
FIG. 4 is a graph showing the torque as a function of the speed for a hysteresis brake.

The energy dissipated in the rotating disk per revolution is constant and independent of time. As shown in FIG. 4, the torque C is therefore constant and equal to $C_{max}$ and independent of the speed n up to the speed $n_{max}$.

The hysteresis losses $E_h$ per unit volume of the disk are equal to the surface area S of the hysteresis loop:

$$E_h = S$$

The displacement $\alpha$ of the disk 210 by one tooth pitch of the stator 200 is given by:

$$\alpha = 2\pi/N_d$$

where $N_d$ is the number of teeth on the stator 200.

The torque C per unit volume of the disk 21 is:

$$C = E_h/\alpha = N_d S/2\pi$$

The maximum disk torque is proportional to the surface area of its hysteresis cycle and to its volume V:

$$C_{max} = N_d SV/2\pi$$

The invention has been described above with reference to yaw control in a helicopter but it is to be understood that it applies equally well to any parallel or trim type actuator.

There is claimed:

1. Actuator comprising a direct current motor driving a friction device through a non-reversible gearbox, said friction device connected to a speed reducer driving an output shaft of said motor, said friction device disposed between said non-reversible gearbox and said speed reducer and a friction exceeded sensing device disposed between said speed reducer and said output shaft adapted to cut off a supply of power to said motor.

2. Actuator according to claim 1 wherein because of the presence of said speed reducer friction developed by said friction device is greater than friction exerted on said actuator.

3. Actuator according to claim 1 wherein said friction exceeded sensing device comprises contacts detecting slippage of said friction device.

4. Actuator according to claim 1 wherein said friction exceeded sensing device comprises an output shaft torque sensor.

5. Actuator according to claim 1 wherein said friction device is a hysteresis brake.

* * * * *